United States Patent [19]

Wong et al.

[11] 4,142,996

[45] Mar. 6, 1979

[54] METHOD OF MAKING HOMOGENOUS METAL OXIDE VARISTOR POWDERS

[75] Inventors: Joe Wong; Jan W. Szymaszek, both of Schenectady, N.Y.

[73] Assignee: General Electric Company, Schenectady, N.Y.

[21] Appl. No.: 844,657

[22] Filed: Oct. 25, 1977

[51] Int. Cl.$^2$ .......................... H01B 1/08; H01B 1/06
[52] U.S. Cl. .................................. 252/518; 252/519; 252/521; 106/39.5; 264/61; 264/66; 264/13; 264/332
[58] Field of Search ....................... 252/518, 519, 521; 106/39.5; 264/61, 66, 13, 332

[56] References Cited

U.S. PATENT DOCUMENTS 3,950,274  4/1976  May ....................................... 252/519
4,094,061  6/1978  Gupta et al. .......................... 29/612

Primary Examiner—Benjamin R. Padgett
Assistant Examiner—E. Suzanne Parr
Attorney, Agent, or Firm—Lawrence D. Cutter; Joseph T. Cohen; Marvin Snyder

[57] ABSTRACT

A method for manufacturing metal oxide varistors with an extremely homogeneous dispersion of metal oxides is disclosed. In accordance with one embodiment of the invention, nitrates of zinc and certain metal additives are heated to form a hydrated solution which is further heated to form a dehydrated melt, which is further heated to form an extremely homogeneous dispersion of the metal oxides. Tin and antimony are added as oxides rather than nitrates. This process eliminates the need for ball milling.

13 Claims, 3 Drawing Figures

METHOD OF MAKING HOMOGENOUS METAL OXIDE VARISTOR POWDERS

BACKGROUND OF THE INVENTION

This invention relates to a method for manufacturing polycrystalline metal oxide varistors. More particularly, this invention relates to a novel process for producing the varistor powder which is used in the pressing stage of varistor manufacture. The process disclosed produces varistor powder having a very high degree of homogeneity. This property of homogeneity is important both in varistors for low voltage applications and in varistors for high voltage application.

The primary ingredient in varistor manufacture is zinc oxide. To this zinc oxide is added the oxides of several other metals, notably bismuth, antimony, cobalt, manganese, tin, barium, boron, nickel, and magnesium. Other metal oxide additives include oxides of the rare earth elements. The zinc oxide is however, the largest single ingredient, the grain size of which largely determines the breakdown voltage in varistors.

Once the varistor powder with all of the desired ingredients is produced, the powder is pressed into a disk, slug, or wafer of the desired shape. Typically, the powder is pressed into a cylindrical shape. Then the pressed varistor wafer is sintered for several hours at temperatures between 1,000° C. and 1,400° C. The sintered ceramic is now coated with a suitable electrode material and wires are attached to the surfaces of the wafer for connection to external circuitry.

In particular, this invention relates to an improved process for producing the varistor powder to be used at the pressing stage of varistor manufacture. Currently, the additive oxides are milled and pre-reacted at a temperature of approximately 900° C., then the pre-reacted product is crushed and mixed with ZnO. This mixture is then introduced into a ball mill whose objective is the further crushing of the powder mix and most importantly, the homogeneous dispersion of each component amongst the others. However, the ball milling process is expensive, time consuming, and inefficient. Ball milling is an attempt to achieve, by means of a mechanical process, the dispersion of the particles of each component of the powder mix with the particles of the other components.

In addition to being an inefficient mechanical procedure, the process of ball milling can introduce contamination from the ball material into the varistor powder mix. For instance, $ZrO_2$ balls that are used presently in ball milling of metal oxide varistor powders release zirconium oxide into the varistor powder mix as a result of the impacts sustained by the balls. The presence of zirconium oxide in the varistor powder mix is highly deleterious in that this substance inhibits zinc oxide grain growth. It is this grain growth, which occurs during the sintering of the pressed varistor powder mix, which is responsible in large part for the characteristics of the varistor device, most notably, its breakdown voltage.

Between each zinc oxide grain there is an intergranular layer and each such layer contributes approximately two to three volts to the breakdown voltage of the varistor. For example, a one millimeter thick slab of varistor material having zinc oxide grains approximately 25 microns in diameter will yield a device with approximately 40 intergranular layers between the electrodes of the varistor, resulting in a breakdown voltage of approximately 120 volts, depending upon the exact composition of the varistor powder. The zirconia that is introduced from the ball milling process is not well dispersed in the powder mix and therefore produces localized regions of inhibited grain growth. This inhomogeneous distribution of zinc oxide grain size results in a varistor device with poor leakage and breakdown characteristics. In particular, it results in so-called hot spots in the varistor wafer which will conduct most of the current through the device rather than having the current density distribution spread evenly across the surface of the device. These hot spots lead to thermal heating and eventual fracturing of the varistor material.

As mentioned above, the ball milling process, even after many hours of milling, does not produce a molecularly homogeneous mixture. This lack of dispersion of the components of the mixture also produces, in a highly complex fashion, a discontinuity of grain growth. As indicated with the zirconia above, this too results in poor electrical properties.

This discontinuity of grain sizes produces highly undesirable electrical properties in both low breakdown voltage and in high breakdown voltage varistor devices. In low breakdown voltage varistors, the thickness of the wafer is small and therefore the number of grains and intergranular boundaries is small. Hence, the breakdown voltage of the device is more sensitive to the number of grains actually present. Similarly, in the high breakdown voltage varistor devices, the energy that must be dissipated is greater and an inhomogeneous varistor will result in the current being channeled through very narrow regions of the device which often fail, either electrically or mechanically, when these narrow regions are forced to channel these higher energies.

Metal oxide varistors exhibit a very non-linear current-voltage characteristic which is expressed by the equation $$I = \left(\frac{V}{C}\right)^\alpha$$

where I is current flowing through the material, V is the voltage across the material, C is a constant which is a function of the physical dimensions of the body of the device, its composition, and the parameters of the process employed to form the body, and is a measure of the voltage at which breakdown occurs, and $\alpha$ is a constant for a given range of current and is a measure of the non-linearity of the resistance characteristic of the varistor. Hence for voltage values below the breakdown voltage, the device behaves like an ohmic resistor of very large value (approximately 10,000 M $\Omega$) but when the breakdown voltage is exceeded, the device behavior is very much like that of a low resistance conductor. For a wide range of current values, $\alpha$ is approximately constant.

When any of the above-mentioned metal oxides need to be added to the varistor powder mix in trace amounts, the ball milling process becomes particularly inefficient and incapable of insuring a homogeneous distribution of the trace material.

SUMMARY OF THE INVENTION

In accordance with one embodiment of the present invention, hydrated nitrates of the metals whose oxides are desired as part of the varistor powder mix, are added to zinc nitrate hydrate which has a low melting temperature of 36° C. If it is desired that the metal oxide varistor powder mix contain tin or antimony oxide, then these oxides are added to the mixture of zinc nitrate and the nitrates of the additive metals. This mixture is then heated to a temperature of approximately 150° C. and this produces a hydrated solution of zinc nitrate with the other metal additive nitrates. As a solution, this hydrated solution possesses a very homogeneous composition. After this solution is formed, it is further heated to approximately 200°-300° C. to drive off the water of hydration thus forming a dehydrated melt. This dehydrated melt is then further heated to a higher temperature of between approximately 600°-800° C. At this elevated temperature, the various metal nitrates decompose to the respective metal oxides accompanied by evolution of nitrogen oxide. These metal oxides are then combined with a suitable slurry wetting agent. At this point, binders may be added to enhance the mechanical machinability and handling of the pressed varistor material, or waxes may be added to facilitate removal of the pressed varistor powder from the pressing machinery. This mixture is finally spray dried to produce the varistor powder for the pressing process.

Since all of the metal oxides are formed from a solution, the resultant powder has a very homogeneous composition with an equal distribution of all of the oxides throughout the material. This process replaces the macroscopic action of the ball mill with the thermal, molecular action which occurs in the hydrated zinc nitrate solution.

The success of this method is based upon the solubility of the nitrates of the desired metals in a solution of zinc nitrate. If, however, the oxides of tin and antimony are desired in the varistor powder mix, then it is necessary to add tin and antimony to the original mixture in the form of their oxides since the nitrates of these elements are not stable. Fortunately, the oxides of tin and antimony are also sufficiently soluable in a solution of zinc nitrate.

In another embodiment of this invention, the process is carried out as described above except that the original mixture does not include zinc nitrate but rather only the nitrates of the additive metals and the oxides of tin and antimony, if they are desired. After the final heating at an elevated temperature, the substance that is produced is a homogeneous mixture of all of the metal oxide additives. At this point, zinc oxide is added and this mixture is fed into the ball milling process described above, after which it is slurry mixed and spray dried. This process does produce a homogeneous mixture of the additive metal oxides and eliminates the need for the introduction of the zinc nitrate.

Another very important aspect of this invention is that the nitrates of the metal additives decompose into the metal oxide at a temperature well below the sintering temperature of the varistor powder. This property of the additive metal nitrates along with their sufficiently mutual solubility renders them particularly good candidates for the process. However, other oxy-salts may be used. For example, in addition to magnesium nitrate, the desired magnesium oxide may be produced through the initial addition of the hydrated oxy-salts of magnesium such as magnesium sulfate, magnesium oxalate, or magnesium acetate.

Accordingly, it is an object of this invention to provide a process for the manufacture of a homogeneous varistor powder suitable for introduction into the pressing stage of varistor manufacture.

It is a further object of this invention to provide a process for the homogeneous introduction of trace quantities of metal oxides into the varistor powder mix to be used in the pressing stage of varistor manufacture.

DETAILED DESCRIPTION OF THE INVENTION

Figure 1:
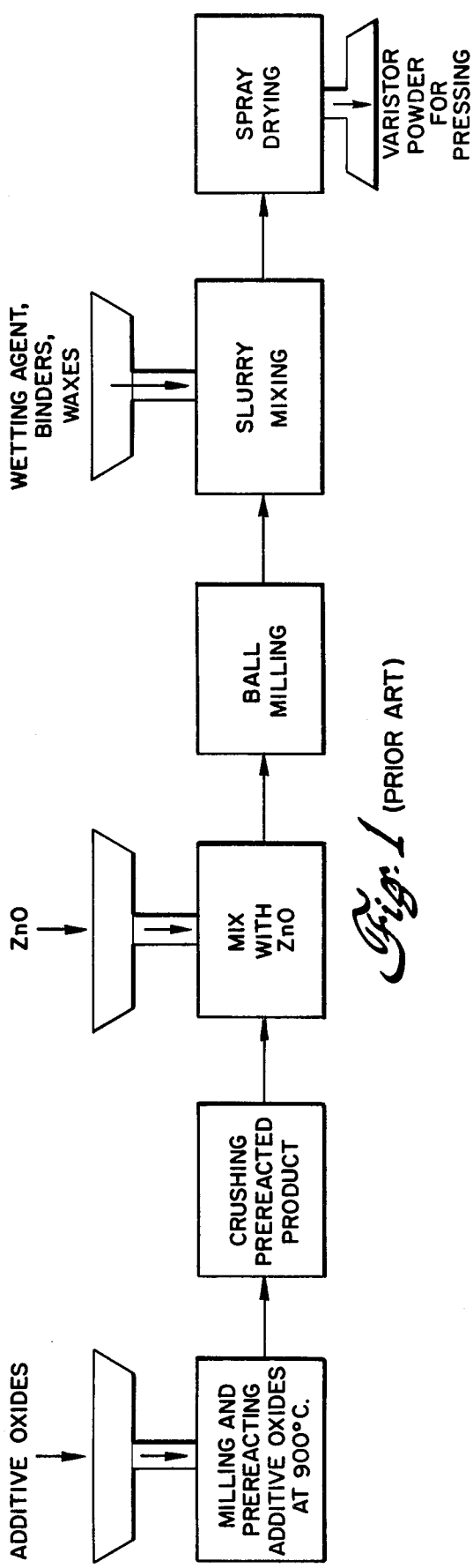
FIG. 1 is a process diagram describing the prior art process for the production of varistor powder to be used at the pressing stage of manufacture.

FIG. 1 is a process diagram describing the prior art process for producing metal oxide varistor powder. This varistor powder is a mixture comprising principally zinc oxide typically to the extent of approximately 90-98 mole percent. This mixture further comprises other metal oxides typically the oxides of bismuth, tin, antimony, manganese, magnesium, cobalt, barium, and boron to the extent of approximately ½ to 1 mole percent each. The term "additive oxides" is applied to those metal oxides comprising the varistor powder mix other than the oxide of zinc. The prior art process shown in FIG. 1 is exemplary of those processes used to produce the varistor powder.

The metal oxides to be added are milled and pre-reacted at a temperature of approximately 900° C. and then the pre-reacted powder is further crushed and then mixed with zinc oxide. The resultant material is then introduced into a ball mill to accomplish a finer crushing and further mixing of the additive oxides and the zinc oxide. This ball milling process typically consumes approximately 20 hours of process time and does not result in the complete intermixing of all of the ingredients, particularly in those situations when trace amounts of material are to be added to the varistor powder. Following the extensive ball milling stage, the mixture is further mixed with a suitable wetting agent to form a slurry which is mixed further. At this stage, binders are often added to the mixture to enhance the mechanical strength of the pressed body. In addition, certain waxes may be added to facilitate removal of the pressed varistor powder wafer from the die members of the pressing equipment. This slurry mixture is then spray dried and the varistor powder is collected.

Typically, the metal oxides to be added are present in amounts approximately between ½ and 1 mole percent each. The exact combination of metal oxide amounts to be added can be varied over a relatively wide range without destroying the desired non-linear current-voltage relationship necessary to achieve varistor characteristics. The process described below encompasses all of these varying compositions and is limited only by the mutual soluability of the oxy-salts involved and their decomposition temperatures, which is explained below.

Figure 2:
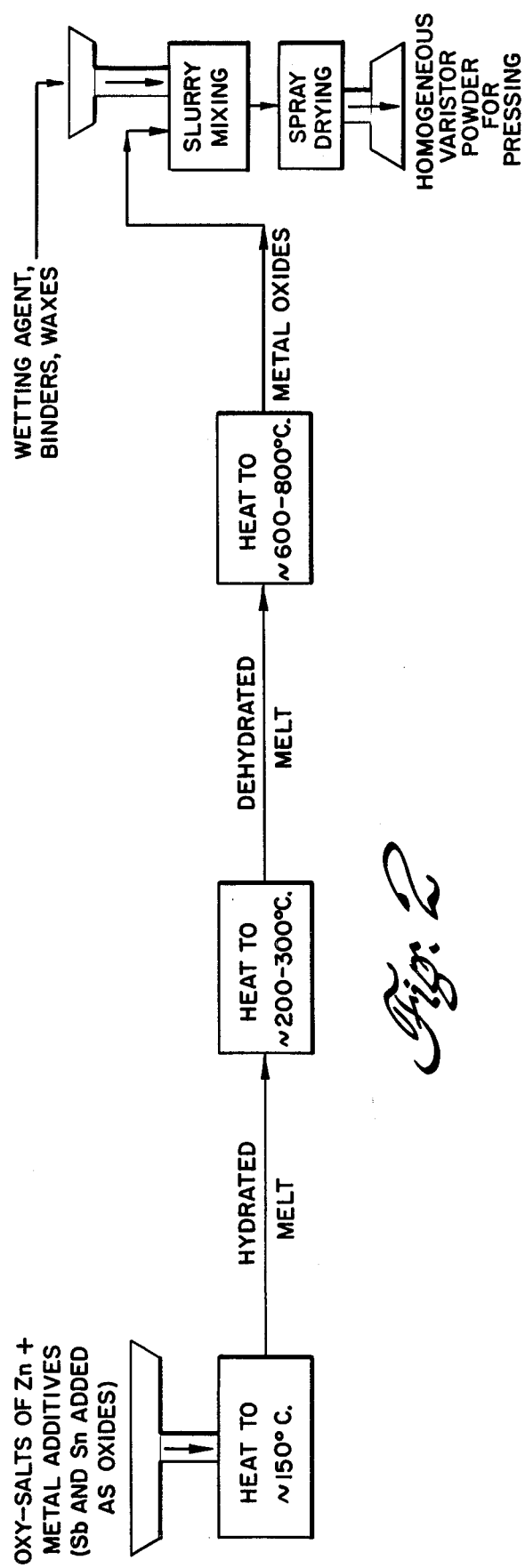
FIG. 2 is a process diagram in accordance with one embodiment of the present invention in which the ball milling step is completely eliminated from the varistor powder manufacturing process.

FIG. 2 is a process flow diagram in accordance with one embodiment of the present invention. It is the object of this process to produce a homogeneous varistor powder for use at the pressing stage of varistor manufacture. Suitable hydrated oxy-salts of zinc and of other desired metal additives are mixed together and heated to a temperature sufficient to form a hydrated solution. An excellent set of oxy-salts which may be used are the nitrates of zinc and the nitrates of metal additives. Zinc nitrate has several desirable properties in this regard. First, zinc nitrate has a relatively low melting point, namely, 36° C. Second, the nitrates of the other metal additives are readily soluble in zinc nitrate and heating the original mixture to form a hydrated zinc nitrate solution is readily accomplished. However, if it is desired that tin or antimony oxides be present in the final varistor powder, it is not possible to add the nitrates of these elements at this stage of the process since these nitrates are not stable. However, the oxides of tin and antimony may be added directly at this stage since they are both soluble in a zinc nitrate solution. This original mixture of material need be heated only to the extent necessary to form a solution of all the compounds in the mixture. In the case that the hydrated oxy-salts added are the nitrates of zinc and the metal additives, it is necessary to heat the mixture only to a temperature of approximately 150° C. in order to form the desired hydrated zinc nitrate solution.

This hydrated solution is then heated to a higher temperature in order to form a dehydrated melt. Again, in the case of nitrates, it is sufficient to heat the solution to a temperature between approximately 200° C. and 300° C. in order to form the dehydrated melt. Because this melt is obtained from a solution, this melt already has a high degree of homogeneity but it is a melt consisting of the oxy-salts with which the process began.

This dehydrated melt is then heated to a sufficiently high temperature to cause the decomposition of the oxy-salts into their metal oxides and other products, typically gases which are driven from the mixture. It is necessary though, that the highest temperature of decomposition for the oxy-salts in this mixture be well below the sintering temperature for the metal oxide varistor powder. Again, the hydrated nitrates of zinc and the other metal additives have a decomposition temperature low enough to permit decomposition without actually sintering the unpressed varistor powder. In the case of nitrates, it is sufficient to heat the mixture to a temperature between approximately 600°–800° C. In the case of nitrates, this produces the appropriate metal oxide plus oxides of nitrogen which are driven from the material. The material at this stage still possesses the homogeneity inherited from its parent solution. It is to be noted that if the oxides of tin or antimony were added at the initial stages of this process, that they are sufficiently stable in the nitrate solution to withstand the temperature needed to decompose the other nitrates. Since the oxides of tin and antimony are dissolved in the original nitrate solution, they persist as such, distributed uniformly throughout the material to that stage where the other metal oxides are produced by heating. After this third heating step, the process proceeds much the same as it does in the prior art. A slurry mixture is formed with an appropriate wetting agent and binders or waxes are added as desired. After slurry mixing, the material is spray dried onto a hot surface from which the homogeneous varistor powder is removed.

Not only does this process produce a varistor powder with an extremely homogeneous dispersion of the compounds involved throughout the material, but it also produces this material in a substantially less amount of time than is required by the ball milling process. For example, in the case that the oxy-salts used are nitrates, the first heating step to approximately 150° C. requires no more than one-half hour and in fact the solution is often formed in a substantially less amount of time than that. The second heating stage of the process, which produces a dehydrated melt, requires no more than one or two hours if nitrates are involved. The third heating stage of the process in the case of nitrates requires no more than approximately two hours to completely decompose the necessary nitrates into their oxides. This is a considerable saving in time over the ball milling process and results in a much improved powder.

Figure 3:
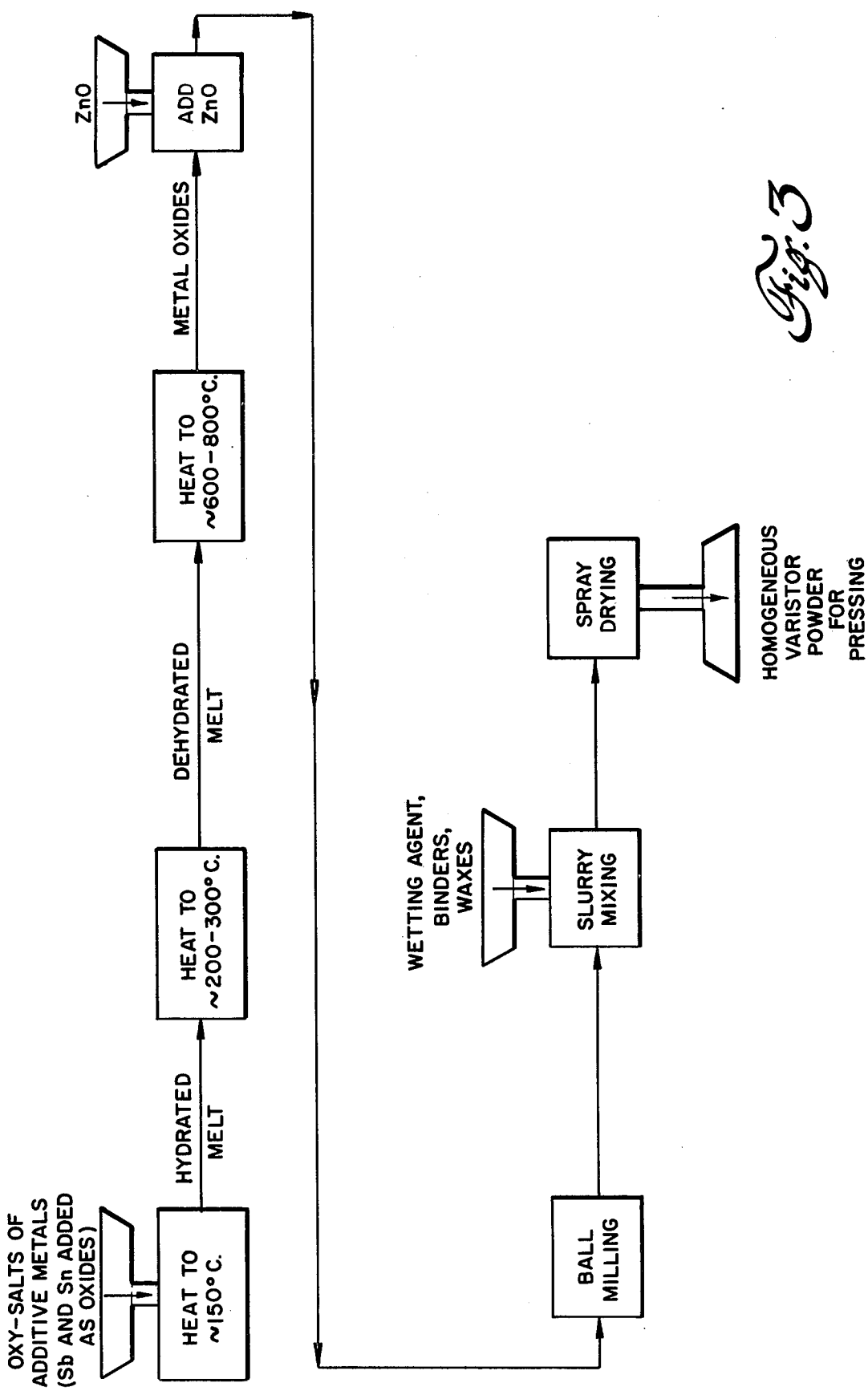
FIG. 3 is a process diagram in accordance with the present invention in which only the additive metal oxides are subjected to the homogenization process of FIG. 2.

Another preferred embodiment of this process is depicted in FIG. 3. As suggested above, the primary constituent of the material going into the initial stage of the process disclosed in an oxy-salt of zinc. In the case of zinc nitrate, if this particular oxy-salt is unavailable or economically unattractive, it is possible to shift the introduction of zinc oxide to a later stage where it is added as an oxide rather than as an oxy-salt. This still requires a ball milling step similar to that in the prior art but here the metal additives are homogeneously dispersed in a uniform composition. However, here the ball milling requires less time and a relatively homogeneous varistor powder is still produced.

Other than the addition of the zinc oxide at a later stage of the process, rather than at the beginning, the process depicted in FIG. 3 proceeds just like the process in FIG. 2. Moreover, the processes described in both FIG. 2 and FIG. 3 are suitable for the addition of trace amounts of metal oxides to the varistor powder. If only trace amounts of a material are to be added, this process becomes very desirable since it is often necessary to achieve a uniform distribution of these trace amounts.

The processes described herein derive their principal advantage from the fact that they produce a homogeneous mixture due to the thermal action of the molecules in the hydrated solution. Thus, the mixing of the compounds that go into the varistor powder occurs at a molecular level. In the ball milling process, the mixing that occurs is a macroscopic mixing of relatively large fragments or conglomerations of particles.

As can be appreciated from the discussion above, there are two criteria that must be applied in the selection of a suitable oxy-salt to use. The first criterion is that the oxy-salts used must be soluble, one in the other, to the extent necessary to produce a sufficient amount of oxide as desired in the final varistor powder. The second criterion is that these oxy-salts must decompose below the sintering temperature of the varistor ceramic. Typically, this means that the oxy-salts must all decompose into their corresponding oxides well below a temperature of 1,000° C.

If it is desired that a particular metal oxide be present in the varistor powder, it may not be necessary to introduce this metal into the initial stage of the process as an oxy-salt. If it has a desired oxide which is stable in the temperature range to be used and which is soluble to the extent desired in the hydrated melt, then it can be added as an oxide at the initial stage of the process.

If hydrated forms of the oxy-salts are not available or otherwise undesirable, then the oxy-salts and other desired oxides are added to an aqueous solution before the first heating step.

For example, if it is required to achieve a homogeneous dispersion of magnesium oxide in the varistor powder, then the above process which utilizes zinc nitrate is usable with several oxy-salts of magnesium. In particular, magnesium acetate, magnesium oxalate, and magnesium sulfate all in their hydrated forms are also usable in addition to hydrated magnesium nitrate. All of the aforementioned magnesium compounds have a high solubility in water and are easily calcined to magnesium oxide at a relatively low temperature (approximately 300°–500° C.).

Devices manufactured in accordance with the above processes exhibit all of the desired varistor properties such as a high value of $\alpha$ and low leakage current.

By way of example, varistor powder is prepared in accordance with the process described in FIG. 2 as follows: One hundred grams of hydrated zinc nitrate crystals is weighed and melted down. To this zinc nitrate is added 1.7 g of bismuth nitrate, 1.0 g. of cobalt nitrate, 0.5 g. of manganese nitrate, 1.0 g. of antimony oxide, 0.41 g. of stannous acetate, 0.09 g. barium nitrate, and 0.04 g. of boric acid. The cobalt nitrate is added last because it imparts a deep purple coloration to the melt and obstructs a visual observation of the salt dissolution. This is important, however, only for experimental purposes. The mixture is then heated to form a solution at approximately 150° C. The temperature of the melt is then raised to between 300°–400° C. at which the nitrates decompose vigorously to give a dark brown viscous liquid. This is then transferred to a platinum crucible and fired in air to 800° C. for two hours. A pale green, free-flowing powder, fairly uniform in color is obtained upon spray drying. The powder is pressed into pellets and sintered in a typical manner of varistor manufacture at 1,300° C. for one hour. At a low current level ($10^{-8}$ amp), the resultant varistor exhibits a perfectly linear, ohmic behavior. If the current is increased to approximately $10^{-6}$ amps, a sharp transition to non-ohmic, non-linear behavior occurs for which the current is proportional to the voltage raised to the power $\alpha$. This particular varistor composition exhibits a value of $\alpha$ equal to 28 which is a perfectly acceptable value for this parameter. It also exhibits a breakdown voltage of approximately 160–234 volts per millimeter, which also is perfectly acceptable for a medium range breakdown voltage varistor composition.

It is thus seen that this is a novel process for producing metal oxide varistor powder with a variety of different additives and compositions but yet which is a varistor powder with an extremely good molecular homogeneity. It is this homogeneity which makes varistors manufactured from this powder particularly suitable for both high and low volage application.

While this invention has been described with reference to particular embodiments and examples, other modifications and variations will occur to those skilled in the art in view of the above teachings. Accordingly, it should be understood that within the scope of the appended claims, the invention may be practiced otherwise than is specifically described.

The invention claimed is:

1. A process of manufacturing homogeneous metal oxide varistor powders for use in the pressing stage of varistor manufacture, which pressed powder is to be sintered to form a ceramic varistor wafer, said process comprising the steps of:

(A) heating a hydrated oxy-salt of zinc with suitable amounts of other oxygen bearing metal compounds selected, for each metal whose oxide is desired in the varistor powder, from the group consisting of the metal oxide and metal oxy-salt, said metal compounds having sufficient solubility in the zinc oxy-salt to yield after thermal decomposition of any metal oxy-salt to its corresponding metal oxide, the amount of metal oxide desired in the varistor powder, said oxy-salts having a decomposition temperature substantially below the sintering temperature of varistor manufacture and substantially above the temperature needed to form a hydrated solution, and said metal oxides having a decomposition temperature substantially above the sintering temperature of varistor manufacture, said heating to occur at a temperature otherwise sufficient to form a hydrated solution;

(B) further heating the hydrated solution in step A at an elevated temperature, from that of step A, sufficient to form a dehydrated melt but substantially below the decomposition temperature of any of the oxygen-bearing metal compounds and substantially below the decomposition temperature of the zinc oxy-salt, whereby a dehydrated melt is produced;

(C) still further heating the dehydrated melt at an elevated temperature, from that of step B, sufficient to decompose any oxy-salt present to its corresponding metal oxide but substantially below the sintering temperature of varistor manufacture;

(D) mixing a wetting agent with the material resulting from step C to form a slurry; and then (E) spray drying the slurry from step D.

2. The process of claim 1 in which the oxygen-bearing metal compounds comprise the metal oxides.

3. The process of claim 1 in which the oxygen bearing compounds of tin oxide and antimony oxide are selected.

4. The process of claim 1 in which the oxy-salts are nitrates.

5. The process of claim 4 in which the nitrates are those of zinc, cobalt, bismuth, magnesium, manganese, nickel, and barium.

6. The process of claim 4 in which step A occurs at a temperature of approximately 150° C. for approximately ½ hours, step B occurs between approximately 200° C. and 300° C. for approximately 1–2 hours, and step C occurs at a temperature between approximately 600° C. and 800° C. for approximately 2 hours.

7. The process of claim 1 in which prior to the heating in step A, the zinc oxy-salt and the oxygen-bearing metal compounds are mixed in an aqueous solution sufficient to dissolve the zinc oxy-salt and any oxygen-bearing metal compound.

8. A process of manufacturing homogeneous metal oxide varistor powders for use in the pressing stage of varistor manufacture, which pressed powder is to be sintered to form a ceramic varistor wafer, said process comprising the steps of:

(A) heating oxygen-bearing metal compounds, other than those of zinc, selected, for each metal whose oxide is desired in the varistor powder, from the group consisting of the metal oxide and the hydrated metal oxy-salt wherein at least one hydrated metal compound is selected, to a temperature sufficient to form a hydrated solution, said oxy-salts being decomposable to the oxide of their corresponding metals upon heating, said metal compounds having sufficient solubility in the resulting hydrated solution to yield, after thermal decomposition of any metal oxy-salt to its corresponding metal oxide, the proportionate amount of metal oxide desired in the varistor powder, said oxy-salts having a decomposition temperature substantially below the sintering temperature of varistor manufacture and substantially above the temperature needed to form a hydrated solution and said metal oxides having a decomposition temperature substantially above the sintering temperature of varistor manufacture;

(B) further heating the hydrated solution in step A at an elevated temperature from that of step A, sufficient to form a dehydrated melt, but substantially below the decomposition temperature of any of the oxygen-bearing metal compounds;

(C) still further heating the dehydrated melt from step B at an elevated temperture, from that of step B, sufficient to decompose any oxy-salt present to its corresponding metal oxide but substantially below the sintering temperature of varistor manufacture;

(D) mixing the material from step C in a ball mill with the appropriate amount of zinc oxide powder;

(E) mixing a wetting agent with the material resulting from step D to form a slurry; and then (F) spray drying the slurry from step E.

9. The process of claim 8 in which the oxygen-bearing compounds of tin oxide and antimony oxide are selected.

10. The process of claim 8 in which the oxy-salts are nitrates.

11. The process of claim 10 in which the nitrates are those of cobalt, bismuth, manganese, magnesium, nickel, and barium.

12. The process of claim 10 in which step A occurs at a temperature of approximately 150° C. for approximately ½ hour, step B occurs at a temperature between approximately 200° C. and 300° C. for between approximately 1-2 hours, and step C occurs at a temperature between aprpoximately 600° C. and 800° C. for approximately 2 hours.

13. The process of claim 8 in which prior of the heating in step A, the oxygen-bearing metal compounds are mixed in an aqueous solution sufficient to dissolve any oxygen-bearing metal compound.

* * * * *